US007171493B2

(12) United States Patent
Shu et al.

(10) Patent No.: US 7,171,493 B2
(45) Date of Patent: Jan. 30, 2007

(54) CAMOUFLAGE OF NETWORK TRAFFIC TO RESIST ATTACK

(75) Inventors: Li Shu, Billerica, MA (US); William Weinstein, Belmont, MA (US)

(73) Assignee: The Charles Stark Draper Laboratory, Cambridge, MA (US)

( * ) Notice: Subject to any disclaimer, the term of this patent is extended or adjusted under 35 U.S.C. 154(b) by 737 days.

(21) Appl. No.: 10/025,017

(22) Filed: Dec. 19, 2001

(65) Prior Publication Data

US 2003/0115364 A1    Jun. 19, 2003

(51) Int. Cl.
*G06F 15/16*    (2006.01)
(52) U.S. Cl. .................................... 709/246; 709/238
(58) Field of Classification Search ............... 709/246, 709/232, 206, 250, 201, 225, 228, 238, 230, 709/234, 208, 221; 370/230, 389, 400, 352, 370/350, 238, 392, 395; 455/432; 713/200, 713/201; 714/749
See application file for complete search history.

(56) References Cited

U.S. PATENT DOCUMENTS

| | | | | |
|---|---|---|---|---|
| 4,802,220 A | * | 1/1989 | Marker, Jr. .................. 380/33 |
| 4,908,828 A | | 3/1990 | Tikalsky |
| 4,914,657 A | | 4/1990 | Walter et al. |
| 5,367,521 A | * | 11/1994 | Sanchez et al. ............. 370/420 |
| 5,412,654 A | | 5/1995 | Perkins |
| 5,475,818 A | * | 12/1995 | Molyneaux et al. ........ 709/208 |
| 5,485,474 A | | 1/1996 | Rabin |
| 5,551,032 A | | 8/1996 | Lyon et al. |
| 5,553,145 A | | 9/1996 | Micali |
| 5,557,266 A | * | 9/1996 | Calvignac et al. ..... 340/825.02 |
| 5,583,940 A | | 12/1996 | Vidrascu et al. |
| 5,610,904 A | | 3/1997 | Eng et al. |
| 5,623,595 A | | 4/1997 | Bailey |
| 5,627,987 A | * | 5/1997 | Nozue et al. ............... 711/200 |
| 5,630,184 A | * | 5/1997 | Roper et al. ................ 709/221 |
| 5,666,420 A | | 9/1997 | Micali |
| 5,668,880 A | | 9/1997 | Alajajian |
| 5,692,124 A | | 11/1997 | Holden et al. |
| 5,699,503 A | | 12/1997 | Bolosky et al. |
| 5,712,907 A | * | 1/1998 | Wegner et al. ......... 379/114.02 |
| 5,742,668 A | | 4/1998 | Pepe et al. |
| 5,757,924 A | | 5/1998 | Friedman et al. |

(Continued)

FOREIGN PATENT DOCUMENTS

EP    0948176 A2    10/1999

(Continued)

OTHER PUBLICATIONS

*Optimistic Fair Exchange of Digital Signatures*—Asokan, Shoup, Waidner (1998) umjy.chonnam.ac.kr/~journey/cs/crypto/papers/optimistic_fair_exchange_of_digital_signatures.ps.*

(Continued)

*Primary Examiner*—Thong Vu
(74) *Attorney, Agent, or Firm*—Goodwin Procter, LLP

(57) ABSTRACT

An apparatus for transmitting a file with enhanced transmission security through a network includes a file-splitting processor that splits the file into a plurality of message segments and addresses the plurality of message segments to a plurality of addresses assigned to a receiving host. The apparatus includes a message segment transmitter for transmitting the plurality of message segments to the receiving host.

32 Claims, 12 Drawing Sheets

U.S. PATENT DOCUMENTS

| | | | |
|---|---|---|---|
| 5,802,503 A * | 9/1998 | Sansone ..................... 705/401 |
| 5,822,433 A | 10/1998 | Böttle et al. |
| 5,828,832 A | 10/1998 | Holden et al. |
| 5,832,228 A | 11/1998 | Holden et al. |
| 5,835,710 A * | 11/1998 | Nagami et al. ............ 709/250 |
| 5,850,451 A | 12/1998 | Sudia |
| 5,856,974 A * | 1/1999 | Gervais et al. ............ 370/392 |
| 5,864,654 A | 1/1999 | Marchant |
| 5,872,847 A | 2/1999 | Boyle et al. |
| 5,875,475 A | 2/1999 | Kizu et al. |
| 5,883,581 A | 3/1999 | Dorenbosch et al. |
| 5,892,903 A | 4/1999 | Klaus |
| 5,903,726 A * | 5/1999 | Donovan et al. .......... 709/206 |
| 5,913,024 A | 6/1999 | Green et al. |
| 5,914,971 A | 6/1999 | Carter et al. |
| 5,935,245 A | 8/1999 | Sherer |
| 5,956,640 A * | 9/1999 | Eaton et al. ............. 455/432.2 |
| 5,968,197 A | 10/1999 | Doiron |
| 5,982,893 A | 11/1999 | Hughes |
| 5,983,350 A * | 11/1999 | Minear et al. ............. 713/201 |
| 5,987,011 A | 11/1999 | Toh |
| 5,987,639 A | 11/1999 | Kivari et al. |
| 5,995,559 A | 11/1999 | Hedberg |
| 6,009,177 A | 12/1999 | Sudia |
| 6,044,486 A | 3/2000 | Underseth et al. |
| 6,044,487 A | 3/2000 | Li |
| 6,052,812 A | 4/2000 | Chen et al. |
| 6,061,798 A | 5/2000 | Coley et al. |
| 6,070,242 A | 5/2000 | Wong et al. |
| 6,072,942 A | 6/2000 | Stockwell et al. |
| 6,081,601 A | 6/2000 | Raivisto |
| 6,081,900 A * | 6/2000 | Subramaniam et al. ..... 713/201 |
| 6,085,178 A | 7/2000 | Bigus et al. |
| 6,098,076 A * | 8/2000 | Rekieta et al. ............. 707/202 |
| 6,112,304 A * | 8/2000 | Clawson ..................... 713/156 |
| 6,118,775 A | 9/2000 | Kari et al. |
| 6,130,881 A | 10/2000 | Stiller et al. |
| 6,131,163 A | 10/2000 | Wiegel |
| 6,137,792 A | 10/2000 | Jonas et al. |
| 6,138,235 A | 10/2000 | Lipkin et al. |
| 6,154,147 A | 11/2000 | Gabrielle et al. |
| 6,167,045 A * | 12/2000 | Pirovano et al. ........... 370/389 |
| 6,167,438 A * | 12/2000 | Yates et al. ................. 709/216 |
| 6,167,513 A | 12/2000 | Inoue et al. |
| 6,175,752 B1 | 1/2001 | Say et al. |
| 6,185,689 B1 | 2/2001 | Todd, Sr. et al. |
| 6,202,081 B1 | 3/2001 | Naudus |
| 6,212,636 B1 | 4/2001 | Boyle et al. |
| 6,226,680 B1 * | 5/2001 | Boucher et al. ............ 709/230 |
| 6,272,538 B1 | 8/2001 | Holden et al. |
| 6,331,983 B1 * | 12/2001 | Haggerty et al. ........... 370/400 |
| 6,333,932 B1 * | 12/2001 | Kobayasi et al. ........... 370/389 |
| 6,389,023 B1 * | 5/2002 | Matsuzawa et al. ... 370/395.31 |
| 6,414,952 B2 * | 7/2002 | Foley .......................... 370/352 |
| 6,429,946 B1 * | 8/2002 | Bresnan et al. ............ 358/1.15 |
| 6,456,614 B1 * | 9/2002 | Guan et al. ................. 370/350 |
| 6,490,631 B1 * | 12/2002 | Teich et al. ................. 709/250 |
| 6,496,477 B1 * | 12/2002 | Perkins et al. .............. 370/228 |
| 6,496,503 B1 * | 12/2002 | Pelissier et al. ............ 370/389 |
| 6,587,438 B1 * | 7/2003 | Brendel ...................... 370/238 |
| 6,625,773 B1 * | 9/2003 | Boivie et al. ............... 714/749 |
| 6,640,305 B2 * | 10/2003 | Kocher et al. .............. 713/194 |
| 6,661,775 B1 * | 12/2003 | Nakayama et al. ....... 370/230.1 |
| 6,662,228 B1 * | 12/2003 | Limsico ...................... 709/225 |
| 6,678,740 B1 * | 1/2004 | Rakib et al. ................ 709/247 |
| 6,684,248 B1 * | 1/2004 | Janacek et al. ............. 709/225 |
| 6,687,758 B2 * | 2/2004 | Craft et al. ................. 709/250 |
| 6,697,871 B1 * | 2/2004 | Hansen ....................... 709/234 |
| 6,735,190 B1 * | 5/2004 | Chuah et al. ............... 370/352 |
| 6,745,231 B1 * | 6/2004 | Megiddo .................... 709/206 |
| 6,760,748 B1 * | 7/2004 | Hakim ....................... 709/204 |
| 6,763,012 B1 * | 7/2004 | Lord et al. .................. 370/338 |
| 6,782,401 B2 * | 8/2004 | Winokur ..................... 707/201 |
| 6,941,386 B2 * | 9/2005 | Craft et al. ................. 709/250 |
| 7,010,607 B1 * | 3/2006 | Bunton ....................... 709/228 |
| 7,031,309 B1 * | 4/2006 | Sautter et al. .............. 370/392 |
| 2001/0009025 A1 | 7/2001 | Ahonen |
| 2002/0026482 A1 * | 2/2002 | Morishige et al. .......... 709/206 |
| 2002/0046239 A1 * | 4/2002 | Stawikowski et al. ...... 709/203 |
| 2002/0056047 A1 * | 5/2002 | Lehman ...................... 713/200 |
| 2002/0065930 A1 * | 5/2002 | Rhodes ....................... 709/232 |
| 2002/0156612 A1 * | 10/2002 | Schulter et al. ............... 703/23 |
| 2002/0156915 A1 * | 10/2002 | Haggar et al. .............. 709/238 |
| 2002/0188656 A1 * | 12/2002 | Patton et al. ............... 709/201 |
| 2004/0025057 A1 * | 2/2004 | Cook .......................... 713/201 |

FOREIGN PATENT DOCUMENTS

WO        WO 00/27086        5/2000

OTHER PUBLICATIONS

*TCP Splicing for Application Layer Proxy Performance*—Maltz, Bhagwat(1998) www.cs.umd.edu/users/pravin/TR-21139.ps.gz.*

*Development of an PCI to SCI Card with FPGAs*—Acher, Karl, Leberecht wwwbode.informatik.tu-muenchen.de/~karlw/publications/PS-Files/SCIbook-GA.ps.gz.*

Anonymous Connections and Onion Routing www.onion-router.net/Publications/JSAC-1998.pdf.*

A Heuristic Routing Algorithm for Shared Protection in Connection-Oriented Network www.utdallas.edu/~jjue/publications/sprot_ocom01.pdf.*

Security Issues in Control, Management and Routing Protocols www.terena.nl/conferences/archive/tnc2000/proceedings/3A/3a2.pdf.*

Dynamic host-group/multidestination routing for multicast sessions He, Q.; Ammar, M.; Computer Communications and Networks, 2003. ICCCN 2003. Proceedings. The 12th International Conference on Oct. 20-22, 2003 pp. 428-433.*

Convery et al., *Cisco SAFE: A Security Blueprint for Enterprise Networks*, [retrieved on Aug. 15, 2001]. Retrieved from the Internet: <URL: http://www.cisco.com/warp/public/cc/so/cuso/epso/sqfr/safe_wp.htm>.

Ferguson et al., *RFC 2827: Network Ingress Filtering: Defeating Denial of Service Attacks Which Employ IP Source Address Spoofing*, Network Working Group, The Internet Society, May 2000 [retrieved on Aug. 15, 2001]. Retrieved from the Internet: <URL: http://rfc.asuka.net/rfc/rfc2827.html>.

Chaum, Untraceable Electronic Mail, Return Addresses, and Digital Pseudonyms, *Communications of the ACM*, Feb. 1981, vol. 24, No. 2, [retrieved on Feb. 19, 2002]. Retrieved from the Internet: <URL: http/world.std.com/~franl/crypto/chaum-acm-1981.html>.

Syverson et al., *Towards an Analysis of Onion Routing Security*, Workshop on Design Issues in Anonymity and Unobservability, Berkeley, CA, Jul. 2000.

Berthold et al., Project "*Anonymity and Unobservability in the Internet*", Workshop on Freedom and Privacy by Design/CFP2000, [retrieved on Feb. 20, 2002]. Retrieved from the Internet: <URL: http/www.inf.tu-dresden.de/~hf2/publ/2000/BeFK2000cfp2000/index.html>.

Dolev et al., *Xor-Trees for Efficient Anonymous Multicast and Reception*, Technical Report 99-03, Department of Mathematics and Computer Science, Ben-Gurion University, Beer-Sheva, Israel, Dec. 1998. Extended abstract in the Proceedings of the Seventeeth Annual IACR Crypto Conference, CRYPTO'97, Springer-Verlag LNCS:1294, pp. 395-409, 1997.

Raymond, *Traffic Analysis: Protocols, Attacks, Design Issues and Open Problems*, Berkeley International Computer Science Institute (ICSI) Technical, Report TR-00-011, p. 7-26, Jul. 2000.

Berthold et al., *Web MIXes: A system for anonymous and unobservable Internet access*, Designing Privacy Enhancing Technologies-Hannes Federrath (Ed.), Proceedings of the Workshop on Design Issues in Anonymity and Unobservability, LNCS 2009, Springer-Verlag, Heidelberg 2001, 115-129.

Cabrera et al., "Swift: Using Distributed Disk Striping to Provide High I/O Data Rates," *Computing Systems*, vol. 4, No. 4, 1991, pp. 405-436.

Cohen, "Segmented Information Dispersal," *Dissertation University of California*, 1996, pp. 1-8, line 9.

Hsiao et al., "A Performance Study of Three High Availability Data Replication Strategies," *Proceedings of the International Conference on Parallel and Distributed Information Systems*, Dec. 4, 1991, pp. 18-28.

Long et al., "Swift/RAID: A Distributed RAID System," *Computing Systems*, 1994, pp. 333-359.

Maxemchuk, "Dispersity Routing in High-Speed Networks," *Computer Networks and ISDN Systems 25*, 1993, pp. 645-661.

Rabin, "Efficient Dispersal of Information for Security, Load Balancing, and Fault Tolerance," *Journal of the Association for Computing Machinery*, vol. 36, No. 2, Apr. 1989, pp. 335-348.

Tsirigos et al., "Mutipath Routing in Mobile Ad Hoc Networks or How to Route in the Presence of Frequent Topology Changes," *MILCOM 2001*, Oct. 29-31, Vienna, Virginia, USA, pp. 1-6.

* cited by examiner

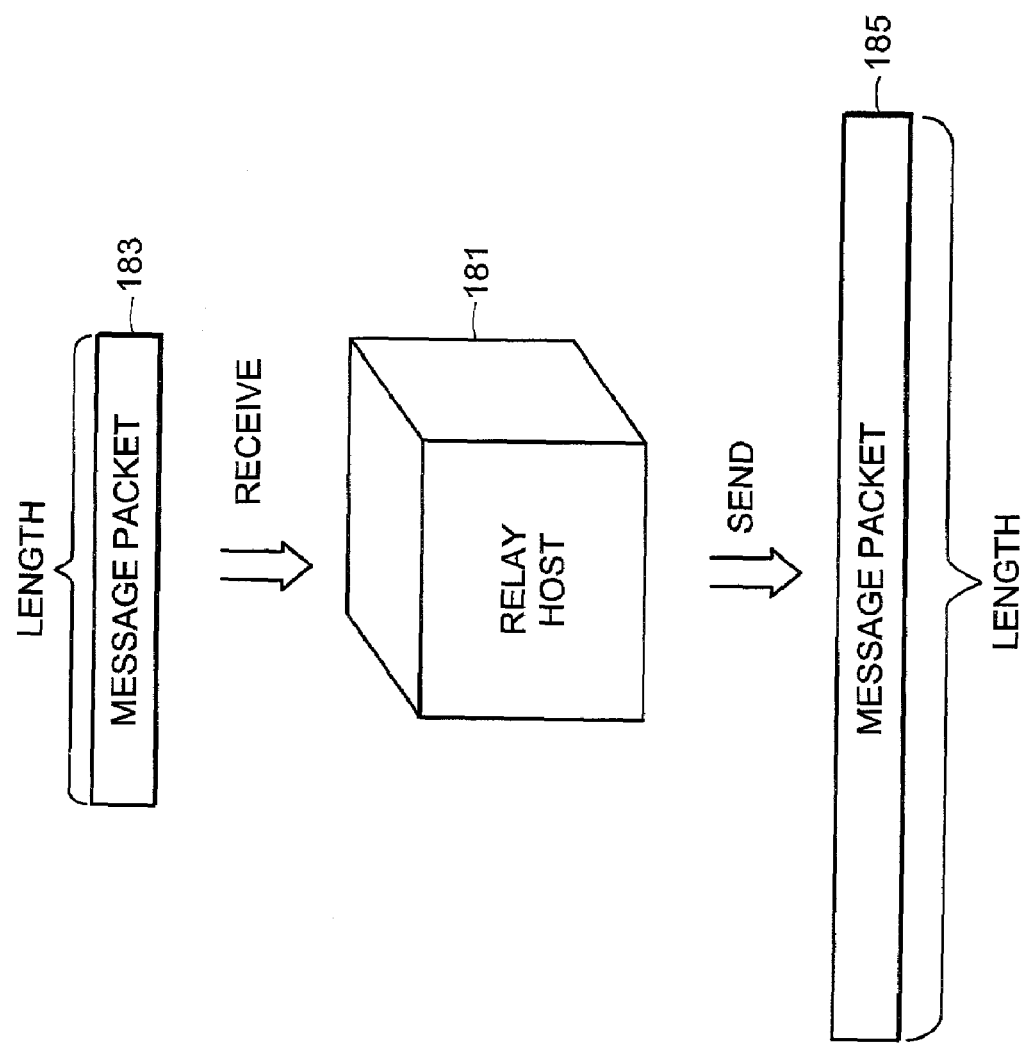

CAMOUFLAGE OF NETWORK TRAFFIC TO RESIST ATTACK

TECHNICAL FIELD

The invention generally relates to electronic communications, and, more particularly, to data assurance and security in a network-based communications environment.

BACKGROUND INFORMATION

Low cost electronic communications may be realized through use of preexisting, open networks, in particular the Internet. A private network may utilize the existing Internet infrastructure to reduce the cost of implementing and maintaining hardware and software to establish networked communication for a group of private users.

Virtual private networks ("VPN") entail one approach to use of the Internet, or other publicly available network, as an alternative to expensive, dedicated communications networks. A VPN may utilize packet-switched communications in a software-defined, secure network that resides within a larger, publicly switched network. A telecommunications provider provides access to the public network for members of the VPN. Thus, the VPN shares the public network for communications traffic. In effect, the cost of building and maintaining the public network is shared by the many users of the network.

VPNs are particularly cost effective, for example, for highly mobile workforces and smaller companies. A telecommunications company can provide the network, or preexisting networks, such as the telephone network or the Internet, can be utilized via the use of tunneling software to interface to private components of the network.

Such private networks inherently expose themselves to security risks. The Internet is an intentionally open, unsecured communication environment. It is designed to be available to the general public, businesses, government agencies and non-profit organizations. This openness leaves the network vulnerable to attacks, and those private networks that use the Internet for communications similarly expose themselves to attack via the Internet.

In contrast to the needs of the Internet, a private network must generally limit access. The private network must protect itself form security risks, as well as limit access to private resources as needed. Such restrictions help to maintain the integrity of data.

Private networks, e.g. intranets or extranets, that are implemented with Internet-based interconnections typically use a number of approaches to protect the private components of the network from public access. Protection mechanisms include features such as firewalls, access lists, host and application layer security, and other tools to limit access via the Internet to intranet resources.

Internet-based communications employ well-established, widely known communication protocols, resulting in well-known weaknesses. These weaknesses may be exploited for illicit access to private networks utilizing the Internet for some, or all, of their communications. While equipment and software vendors attempt to standardize their Internet targeted products, deficiencies in the standardization process create further weaknesses that arise due to differing implementations by various vendors.

Moreover, increasing the size of a private network generally increases opportunities to exploit that network. A larger network not only presents more avenues for attack, but also presents greater difficulty in tracking access privileges, updating security procedures, and preserving synchronization between security procedures.

Numerous techniques that exploit network deficiencies have evolved. These techniques include hijacking of a host address, spoofing an address and denial-of-service attacks. In the last of these, the perpetrator generally attempts to shut down a network resource, such as a host, by flooding the resource with messages.

Various systems have evolved to protect network communications. Commonly, encryption techniques are employed to hide the contents of network communications traffic. Some methods mask the real Internet Protocol ("IP") address of source and destination hosts by "tunneling" through hardware gateways. Tunneling systems generally, however, can reveal true addresses between gateways. Existing systems also typically fail to guard against denial-of-service attacks.

Further, existing systems may fail to mask communication traffic patterns. Systems that provide some masking of traffic typically are unsuitable for packet-switched, networked environments.

Some techniques protect against denial-of-service attacks by deploying redundant copies of critical data that reside on servers. Implementations typically employ either majority voting on fully replicated data servers or distributed encoded redundant data across physical servers. Synchronizing the data on the redundant servers is a complex task. Further, the IP addresses of the servers are fully exposed, as is the profile of data traffic. Unless the number of replicated servers is sufficiently large, their collective ability to withstand denial-of-service attacks is limited.

Moreover, data assurance methods typically do not provide security, and may even decrease network security. For example, applying channel coding to message bits and blocks does not provide any data assurance during failure of a route or path. Neither do existing methods of data encryption and authentication provide data assurance when data packets are lost due to interception or jamming.

Traditional methods of providing data security against eavesdropping (such as keyed encryption) grew out of point-to-point or single user communication channel models. Most communications now take place over networks and require improved methods of assurance and security.

SUMMARY OF THE INVENTION

The invention involves secure data transmission over a network. In particular, the invention involves methods and devices that provide security for a network that utilizes the Internet for communications. The methods and devices include features such as assigning, and reassigning, multiple addresses to hosts in the network, and monitoring the loss of message segments to detect and respond to network attacks. Further, the methods and devices serve to camouflage the content and pattern of network message traffic.

The invention in part involves a secure network of participating hosts that implement software or hardware to enable participation in the secure network. The hosts may be, for example, personal computers and/or computer servers. Only a small fraction of the secure network is exposed to an adversary monitoring the network at one of the participating hosts. Thus, a solution is provided for the problem of the publicly visible addresses that are typically associated with transmitted communications. Further, use of multiple, redundant pathways and hosts identified by multiple addresses provides resistance to, for example, denial-of-service attacks.

The invention is suited to protect various types of communications. The communications may be digital electronic communications and may include, for example, messages. The communications may be sent via a network in the form of packets. The network may be, for example, a wired, wireless or optical network. In the following discussion, the terms "file, "communication", "message" and "data" are used interchangeably to express the idea of information transmitted between parties. The particular form that the information assumes during transmission may be binary, as found in modern digital communications.

Improved security may be accomplished by use of one or more intermediaries, i.e. hosts, to relay communications between parties, for example, a source and a destination. Use of multi-hop forwarding can provide concealment of the true origin and destination of traffic between gateways. The invention can eliminate a need for redundant servers to provide denial-of-service protection, in particular, against flooding attacks.

The invention involves the use of a virtual network topology, and message packet relaying, to limit the exposure of real destination addressees at any given point in the virtual network. Distribution of messages via multiple relay hosts can mask the actual pattern of traffic among participating hosts. Messages may be transmitted over multiple pathways using K-out-of-N threshold encoding, in order to protect against at least some denial-of-service attacks.

For example, by breaking a message into a K-part vector and multiplying that vector (mod x) by a selected K-by-N matrix, one can create N elements (each of the same bit length as each of the K parts.) The message can be recovered from any K parts by multiplying by the inverse matrix (created from the K rows of the original matrix used to generate the K recovered parts.) The N parts can be numbered, for example, to permit determination of which row of the original matrix generated each part.

The status of the virtual network may be monitored by observing the arrival or non-arrival of, or damage to, parts of a message. This may provide detection of tampering, and tracking of the progress of an attack. The identity of an individual host may be distributed over multiple addresses, for example, IP addresses, to dilute the impact of, for example, a flooding attack against a particular address.

The ability to reassign the IP addresses that define the particular host can further improve security. The reassignment can be performed to permit continuing participation of the host while reassignment information is distributed to other participating hosts.

A participating host may be assigned multiple addresses to increase the difficulty of intercepting messages or message segments sent to the host. Further, message segments sent from a host may be assigned different origination addresses to increase the difficulty of intercepting or identifying a segment sent by a host.

An eavesdropper attempting to intercept a message sent between two parties must therefore overcome multiple difficulties. If an eavesdropper observes transmissions, such as data packets, it cannot correctly identify the true destination or source of each packet. Thus, an eavesdropper may be impeded from identifying messages sent from a particular original source to a particular final destination.

Embodiments of the invention may be implemented, for example, via application-level software, or between the IP and TCP layers of an operating system's communication stack. When implemented at the application level, no changes are required to the operating system. The invention may involve a virtual network of cooperating hosts. The network topology limits the number of hosts that can be directly accessed from any one host.

Accordingly, in a first aspect, the invention features an apparatus for transmitting a file through a network. The file can be in binary form, as for a typical computer data file. It can be a file of any form as utilized in electronic and optical network-based communications. The term "transmit" as used herein means the directing of a file from any source location or intermediate location to any intermediate or destination location. The actual transmission of a file may occur via all suitable techniques of file transfer, including, but not limited to, standard file-transfer protocols via an electronic or optical network.

The apparatus includes a file-splitting processor that splits the file into a plurality of message segments and addresses the plurality of message segments to a plurality of addresses assigned to a receiving host. Also included is a message segment transmitter for transmitting the plurality of message segments to the receiving host.

The file-splitting processor may include a file converter that converts the file into N message segments that enable reassembly of the file from a subset of any K of the N message segments, where N and K are positive integers, and N>K>1. The file-splitting processor may also assign a plurality of source addresses to the plurality of message segments to impede unauthorized attempts to observe the true source of a transmitted file. The file can be, for example, a computer data file, such as a binary data file. The processor can be, for example, a computer microprocessor integrated circuit.

Alternatively, an address allocator may be included for assigning and reassigning N addresses to the receiving host. Dynamic reassignment of addresses may protect a receiving host, and a network, from denial-of-service attacks. By updating only a portion of a receiving host's addresses at any one time, the remaining addresses may permit continuing operation of the receiving host. During continuing operation, other hosts in the network may be notified of the identity of the updated addresses. The addresses experiencing the denial-of-service attack are inactivated.

Thus, the apparatus may further include a message segment monitor for detecting non-receipt of at least one of a second plurality of message segments transmitted to the apparatus. In response to the possible tampering, detected via non-receipt of one or more message segments, the host can cease use of addresses used in the attack.

The file-splitting processor, file converter, message segment monitor and address allocator may include, for example, integrated circuits, such as microprocessors. A single integrated circuit or microprocessor may include the file-splitting processor, file converter, message segment monitor and address allocator. One or more microprocessors may implement software that executes the functions of the file-splitting processor, file converter, message segment monitor and address allocator. Further, any of the file-splitting processor, file converter, message segment monitor and address allocator may be implemented in software, firmware or hardware (e.g. as an application-specific integrated circuit). The software may be designed to run on general-purpose equipment or specialized processors dedicated to the functionality herein described.

In a second aspect, the invention features a method of secure transmission of a file through a network. The method includes splitting the file into a plurality of message segments, addressing the plurality of message segments to a plurality of addresses assigned to a receiving host, and transmitting the plurality of message segments to the receiving host. The multiple addresses assigned to the host protect the host from attack.

The segments may be addressed in a one-to-one correspondence between the segments and at least a portion of the addresses. The file may be split by converting the file into N message segments that enable reassembly of the file from a subset of any K of the N message segments, where N and K are positive integers, and N>K>1.

The method may further include assigning N addresses to the receiving host. The N message segments may be addressed to the N addresses assigned to the receiving host. The receiving host may cease to receive messages via at least one address upon detection of an attack on the address, for example, during a denial-of-service attack. The receiving host may be permitted to cease receiving messages via no more than (N−K) addresses, thereby ensuring reassembly of the file by the receiving host.

The method may further entail the receiving host splitting a reassembled file into N message segments, and transmitting the N message segments from the N addresses. The multiple addresses can protect the network from attack. The receiving host may retransmit the plurality of message segments to at least two intermediate hosts to relay the message segments along more than one path through the network. For example, traffic patterns for files or message segments may be distributed through the network to camouflage network traffic patterns.

The method may include selection of a virtual network from a number of hosts that include the receiving host, and the assignment of each one of the hosts in the virtual network to one of multiple domains. Each one of the message segments may be permitted to travel to the receiving host only via relays between host pairs. Message segment hops may be restricted to hops between two hosts in the same domain, or two hosts in neighboring domains.

Each host may be permitted to reveal only addresses of hosts in the same domain and addresses of hosts in the neighboring domain. This can protect the network from attacks that require knowledge of host addresses. Further, a plurality of source addresses may be assigned to the message segments to impede unauthorized attempts to observe a true source of a transmitted file.

The method may further include receipt of at least a portion of the message segments and reassembly of the file from the received message segments. The reassembled file may be split into a second plurality of message segments for retransmission.

The message segments may be transmitted to an intermediate host or a destination. For example, the message segments may be relayed to a destination via a number of intermediate relaying hops. The destination may be, for example, a server computer or a desktop computer. Similarly, message segments may be transmitted from a source or an intermediate host.

The receiving host may monitor non-receipt of message segments to detect tampering with message segment transmission. For a more robust network, N addresses may be assigned to the receiving host, and a portion of the addresses may be repeatedly changed. A portion of the N addresses may be changed, while notifying the network of the changed addresses. Thus, addresses may be dynamically updated; that is, the network may continue to function while a portion of the addresses are changed.

Some embodiments include additional tampering detection and protection features. A sending host may add status information concerning itself to a message segment. A receiving host may then interpret the status information to detect tampering with message segment transmission.

In a third aspect, the invention features a method of secure transmission of a file through a network. The method includes splitting the file into a plurality of message segments. A plurality of source addresses are assigned to the plurality of message segments to disguise the origin of the file prior to transmitting the message segments.

In a fourth aspect, the invention features a method of secure transmission of a message through a network. The method includes splitting the file into a plurality of message segments. Each message segment includes a destination specifier, routing information and message data. The routing information and message data may be encrypted. A receiving host may then decrypt the routing information to determine a downstream destination host. Next, the receiving host encrypts the routing information and message data in accordance with an encryption protocol accessible to the destination host, and transmits the thus-encrypted message segment to the destination host. Repetition of these steps for other message segments facilitates recovery of the message by an ultimate destination host.

In a fifth aspect, the invention features a method of defining and operating a network topology to camouflage network traffic patterns. The method includes assigning each one of a plurality of hosts to one of a plurality of domains. Message transmission is permitted from each host to hosts within the domain of the host or a domain that neighbors the domain of the host. This restriction on message traffic defines multiple redundant relay paths among hosts. The traffic is distributed in such a manner as to camouflage message sources and destinations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 3b is a block diagram that illustrates an embodiment that changes the length of a retransmitted message segment.

DESCRIPTION

Figure 1:
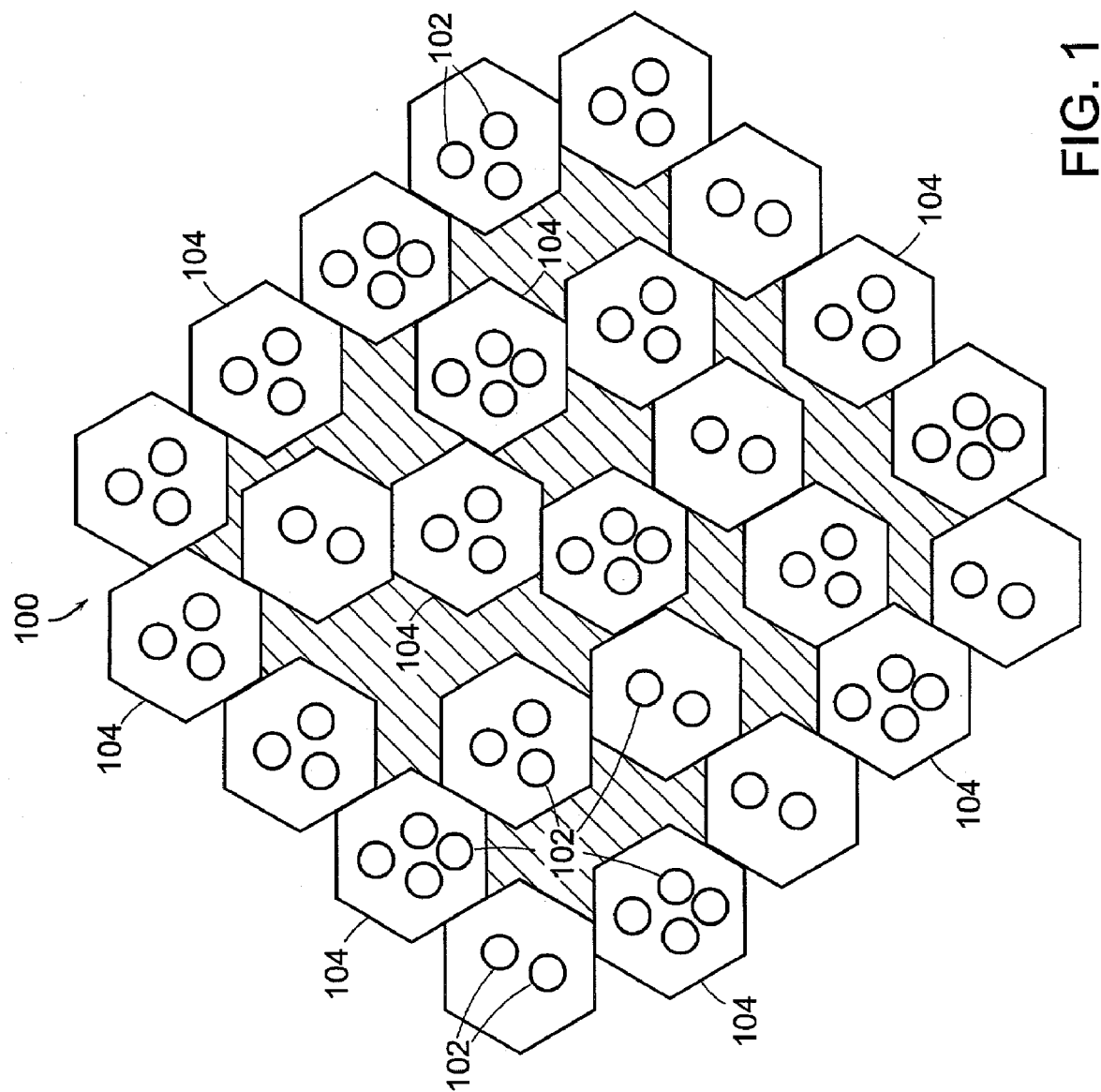
FIG. 1 illustrates an embodiment of a virtual network that has domains that include hosts.

In this Description, the terms "file", "message", "data" and "data file" are understood to refer to any entity of data that may be transferred via analog or digital means. The entity may originate in analog or digital form, and, at various times, may be stored in analog or digital form. The entity is capable of transfer between two distinct physical locations via, in particular, electronic, wireless and optically based communications.

The invention involves communications networks that make use of open networks, such as the Internet, for at least some of their communication links. In some embodiments, the invention involves a software-implemented method to resist attacks on network-based communications via camouflaging of network traffic. In part, messages are divided into segments and the segments are relayed between multiple hosts to mask traffic patterns in a set of cooperating hosts. Further, multiple Internet Protocol (IP) addresses may be assigned to a single host, with message segments directed to the multiple IP addresses that identify the single host.

A method may be implemented with application level software or between the IP and TCP protocol layers. The method defines a virtual network ("Vnet") among private network-enabled hosts. The method restricts the number of hosts that can be directly accessed by any given host. Traffic from a source host to destination host is relayed via intermediate, accessible hosts. In this manner, real IP addresses that are exposed in the vicinity of a given host are only those IP addresses that are accessible to the given host. This limits the exposure of other hosts in the Vnet to an attacker monitoring traffic near a single host. Further, the internal structure of the Vnet is not revealed when a gateway host provides access to non-Vnet hosts.

The method may also harden each host against denial-of-service attacks. A host is associated with a set of N IP addresses, where N is an integer. A message intended for the host (i.e., server) may be split into N message segments, with each segment directed to one each of the N IP addresses. The server may then reconstruct the message from a subset of the N segments (assuming redundancy is included in the message splitting process). Further, denial-of service attacks can be monitored by observing the arrival or non-arrival of message segments at a host.

For additional security, the N IP addresses can be dynamically reassigned from a pool of addresses. By limiting the number of IP addresses that are reassigned at any given time, the virtual network can continue to function normally while reassignment information is distributed to other hosts.

One embodiment includes a protocol that enables a sender to provide information to a destination, i.e., receiver host, about encoding and splitting algorithms that were used to process a message. Some embodiments include methods for inferring the status of the collection of links. Some embodiments include one or more algorithms for determining which combination of encoding and splitting algorithms to use in response to a current status of the links.

FIG. 1 is a block diagram that represents an embodiment of a network configuration. A Vnet 100, includes more than one host 102. The hosts 102 may be, for example, server computers or client computers. Each host 102 is assigned to one of a set of domains 104. A domain 104 is a set of hosts associated with a particular node of the Vnet. Communication between hosts 102 is restricted to direct exchanges between pairs of hosts 102 in the same domain 104, or pairs of hosts 102 in neighboring, i.e., adjacent, domains 104. Other embodiments may permit direct communication between pairs in other sets of domains 104.

Some embodiments of the Vnet 100 employ an open network for some or all of the communications between pairs of hosts. The open network may be the Internet. The communications protocols of the Vnet 100 may operate on top of the Internet network transport layer. Algorithms may manage traffic flow and host identity, i.e., the IP addresses associated with a host.

A Vnet may include, for example, P nodes or domains, where P is an integer and each node includes one or more hosts. At least one communications pathway exists between any two nodes in the Vnet, where a communication pathway may include multiple relaying hops through a Vnet. Each node is of approximately the same degree as every other node. That is, each node has approximately the same number of direct links to other nodes in the Vnet.

A direct link is here understood to refer to directly addressed communications. In some implementations, an actual direct link between two adjacent domains may occur via multiple hops through, for example, servers in a public network, such as the Internet, where the servers are not members of the Vnet. The direct link, however, is direct in the sense that a message or message segment may be publicly addressed to a host in the adjacent domain.

The degree of the nodes is the total number of direct paths from one node to other nodes. Preferably, the degree of the nodes is less than P-1, because in this case each node does not have a direct link to every other node. Hence, communication between any two nodes requires hops, or relays, between intermediate or relay nodes.

Figure 2:
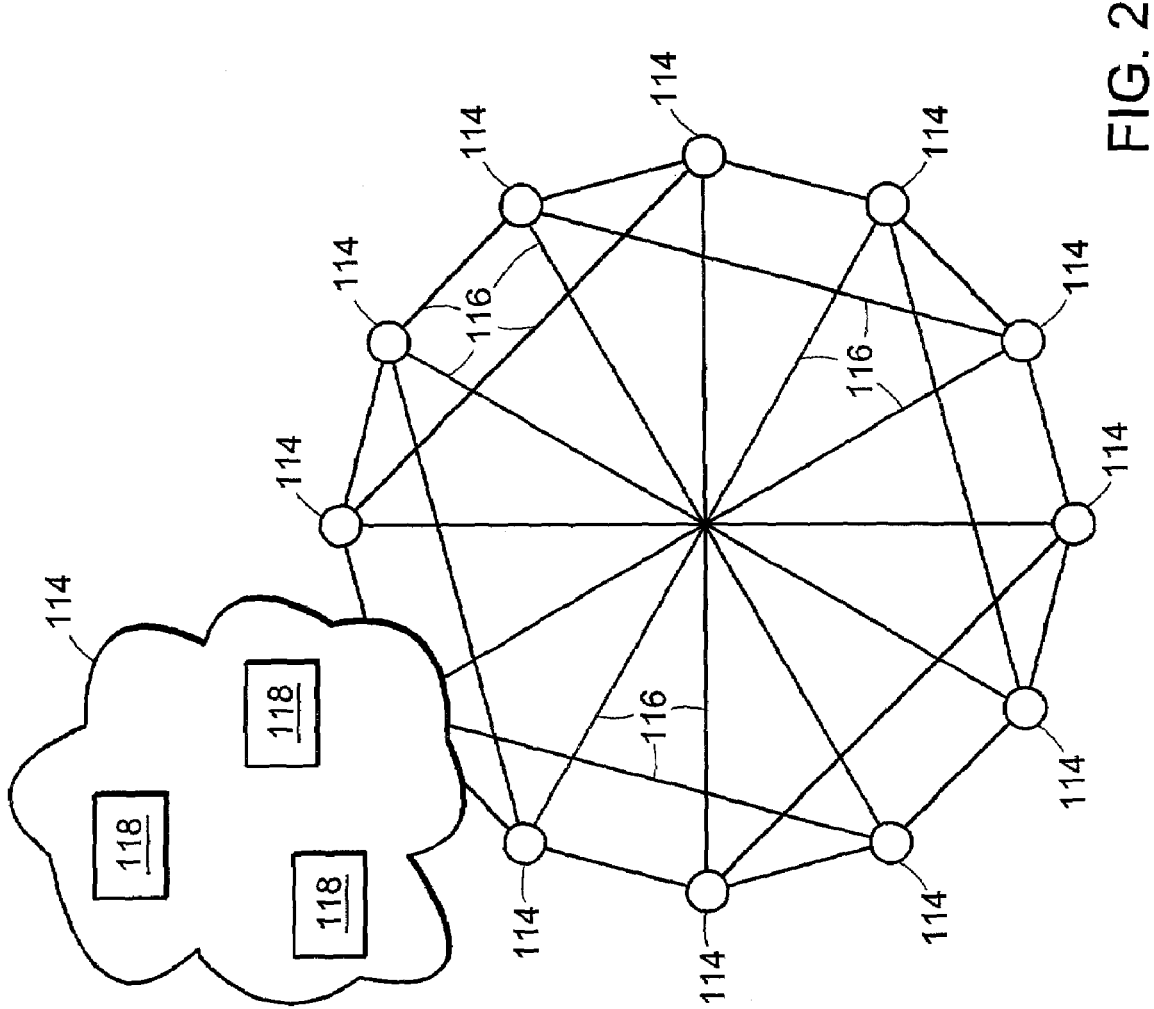
FIG. 2 is a wheel diagram that illustrates an embodiment of a virtual network.

Referring to FIG. 2, a Vnet of the invention may be represented by a "wheel-shaped" network diagram. In the embodiment illustrated in FIG. 2, each small circle represents a domain 114. Each domain 114 has direct communication links 116 with some neighboring domains 114 of the Vnet. The degree of the domains 114 is 4. The "diameter" of the Vnet, i.e., the longest path between any two domains, is small. The diameter of the network shown in FIG. 2 is 2 because the greatest number of direct links required to connect any two domains 114 in the Vnet is two links.

For clarity, a group of hosts 118 residing in a single domain 114 is shown in FIG. 2. Any host in a given domain may thus directly communicate with a host in its own domain, or with a host in a domain that has a direct link with the host's domain. Hosts in a domain can directly address hosts in its own domain and hosts in an adjacent domain. Neighboring, i.e. adjacent, domains have a direct link, without regard to the physical location of components of the domains. For example, two adjacent domains may include hardware components that physically reside on opposite sides of the Earth.

The Vnet topology defines the possible pathways for traffic flow from a source host to a destination host. In preferred embodiments, a routing algorithm will cause a packet to be relayed via one or more hosts in domains other than the domain of the source or destination. Thus, a given host communicates directly only with hosts in its own or a topologically adjacent domain.

In one embodiment that utilizes the Internet, only the IP addresses of hosts in a host's own domain or an adjacent domain are visible to someone monitoring traffic near the host. This limits an intruder to discovery of only a small fraction of the IP addresses of the hosts, in the Vnet. The intruder may be able to learn the identity of some IP addresses by observing message traffic, but the constraints on direct host to host communication in the Vnet prevent the intruder from learning all of the IP addresses of all the hosts in the Vnet.

The topology of a Vnet may be described, in part, via a description of its domain adjacency groups. The domain adjacency group of a domain is the set of domains, including the domain itself, that the domain can reach directly. For example, as described above, the 12-domain wheel depicted in FIG. 2 has a degree of 4 and a diameter of 2. Each adjacency group encompasses five nodes because each domain is adjacent to four other domains. Thus, approximately 40% of the total number of hosts reside in any particular adjacency group, assuming evenly distributed hosts.

For a wheel of a given diameter, the percentage of hosts in an adjacency group decreases as P, the number of domains, increases. For example, a 20-domain wheel of degree five and diameter two has adjacency groups that include only approximately 30% of the total number of hosts. For a fixed P, the degree of the domains varies inversely with the diameter of the wheel.

Selection of a Vnet topology for a particular implementation preferably balances the total number of domains, the percentage of hosts included in an adjacency group, and the impact on system performance resulting from increasing the diameter of the Vnet.

Some embodiments of a Vnet include hosts that support software or hardware that permits the hosts to participate in the Vnet. An embodiment may be implemented as an application-level protocol for routing of packets among the participating hosts. This implementation may use standard Internet protocol to transfer packets between pairs of hosts in the Vnet. Thus, an existing communication protocol stack may not require any changes.

Figure 3A:
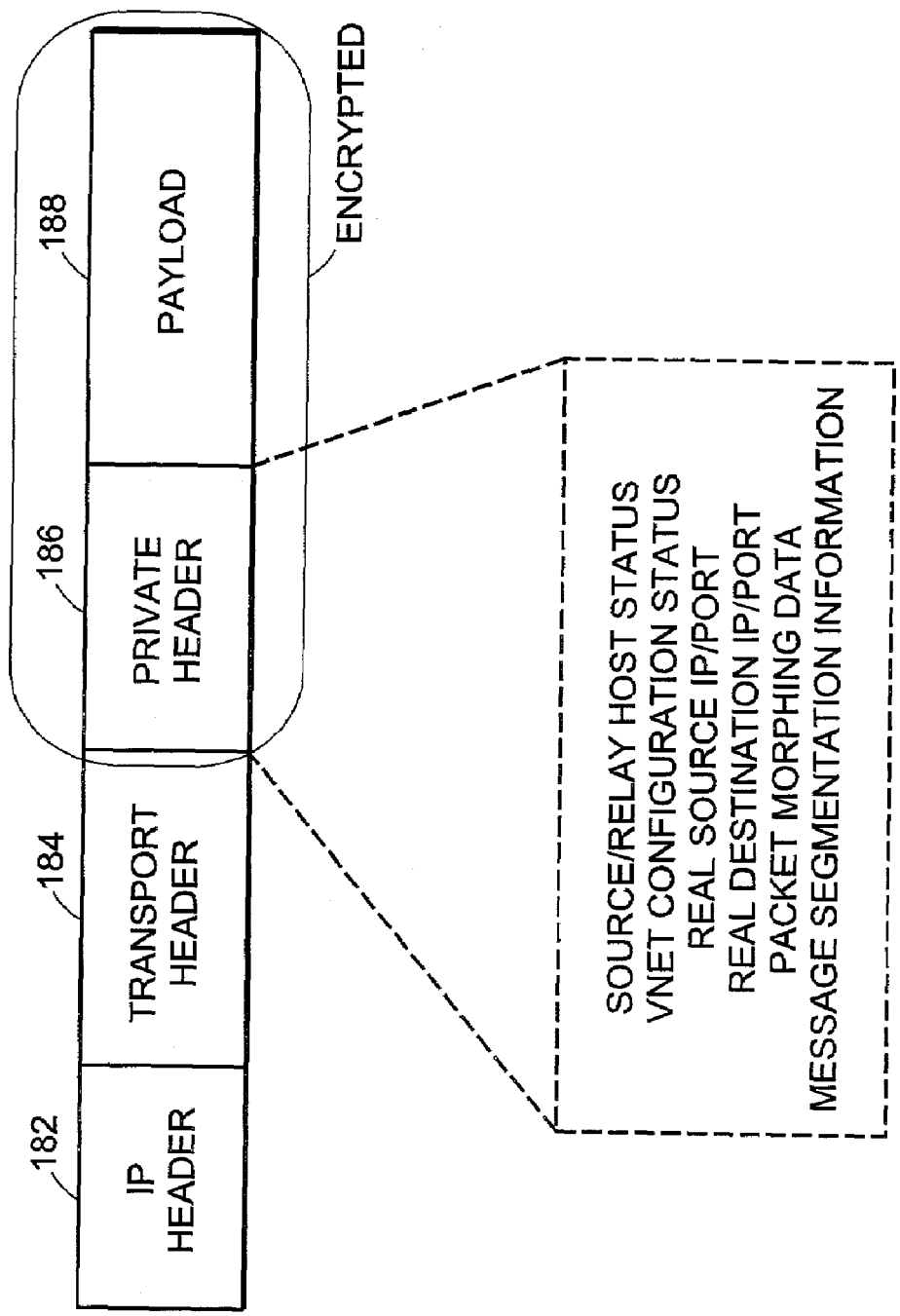
FIG. 3a is a block diagram that illustrates an embodiment of a message segment.

Referring to FIG. 3a, an embodiment of a message packet is illustrated. The packet includes an IP header 182, which is visible to anyone who receives or intercepts the packet. The IP header 182 includes standard data that makes the packet routable. The header 182 includes a packet source host IP address and a packet destination host IP address.

The packet also includes a transport header 184 that assists packet transmission integrity. The transport header 184 may also enable resequencing message packets that arrive out of order at an intermediate or destination host. This may happen, for example, because packets take different pathways through a network.

A private header 186, which includes protocol data, and the message packet payload 188, or real message data, are encrypted, for example, together. This encrypted portion of a packet may form the payload of a Transmission Control Protocol ("TCP") packet or User Datagram Protocol ("UDP") packet, for example. These two transport layer protocols are commonly used in conjunction with IP. The private header 186 includes the IP addresses of the real source and real destination hosts, as well as host and Vnet status, packet morphing data and message segmentation information.

Upon receipt of the message packet, a receiving host decrypts the packet to determine the real destination of the message. The receiving host determines a host to forward the message to, if the receiving host is not the ultimate destination host. The host for forwarding may be the destination host or another relay, intermediate host.

The relaying host may also morph a packet length via random padding, re-encrypt the private header and payload, using, for example, a key for the next relay host, and transmit the message packet to the next relay host. Encryption keys may be negotiated pairwise between participant hosts that employ, for example, a certificate-based key exchange protocol. End-to-end encryption of the payload may be employed to prevent any hosts along the forwarding path from observing the actual message content.

Referring to the block diagram of FIG. 3b, a relay host 181 may alter the length of a received message segment 183, upon retransmission of the message segment. The resent message segment 185 then has a different length from that of the corresponding incoming message segment 183. An attacker who attempts to identify message segments, and the traffic of segments, by observing the length of segments, may be defeated. Thus, attacks based on spotting of length associations may be blocked.

An attacker who monitors a given host may never see real IP addresses of hosts that reside outside of the host's domain or its adjacent domains because Vnet message traffic is restricted in permissible direct hops. In preferred embodiments, messages that are sent to a host that resides in a non-adjacent domain must be relayed via a host in an adjacent domain. A Vnet is preferably configured so that a short relay path exists between any source and destination pair of hosts.

A relationship between an IP address of a host and the host's domain need not exist. Two hosts that belong to the same domain can reside on different nets in the IP address space. Preferably, however, hosts whose total traffic is visible to a monitor, e.g., hosts that reside in a single Local Area Network ("LAN"), belong to the same domain. This configuration may reduce the exposure of participant host IP addresses to the monitor, and may limit the packet forwarding overhead.

In some embodiments, a routing algorithm enables distribution of packets over the set of available pathways between a source host and a destination host. In one embodiment, the algorithm attempts to achieve uniform distribution of traffic through the Vnet. Such a distribution may help to mask the actual traffic pattern of message flow between hosts in the Vnet.

Figure 4:
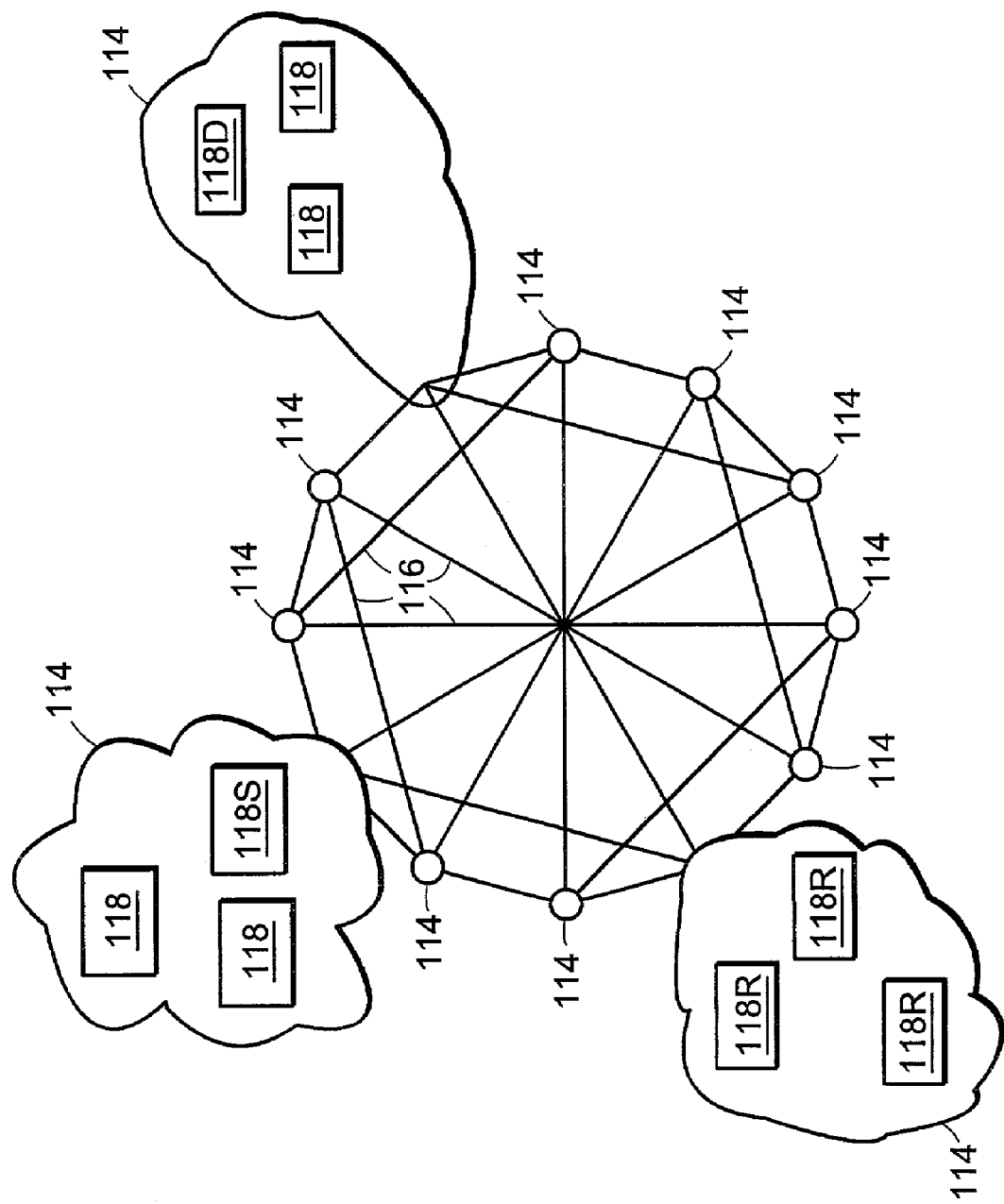
FIG. 4 is a wheel diagram that illustrates an embodiment of a virtual network.

Referring to FIG. 4, one set of pathways between a source host 118S and a destination host 118D is illustrated. As shown in FIG. 4, a source host 118S is transmitting a message to destination host 118D. The domains 114 of the two hosts are not adjacent. Hence, the message must path through at least one intermediate domain 114 that is adjacent to both the domains of the source and destination hosts 118S, 118D.

A message segment transmitted by the source host 118S may travel directly to a relay host 118R in the intermediate domain 114, or may travel to the relay host 118R via another host 118 in the source host's domain. Similarly, a message may then proceed via other relay hosts 118R, or proceed directly to the domain 114 of the destination host 118D.

The message may arrive directly at the destination host 118D, or be relayed via other hosts 118 in the domain of the destination host 118D. Thus, in this embodiment, only one adjacent domain 114 need participate in the communication between the domain 114 of a source host 118S and a domain 114 of a destination host 118D.

In some embodiments, each message is encoded with a K-out-of-N threshold encoding mechanism. Message encoding techniques are well known to those with skill in the art of information and networking security. In the field of digital communications, there is a set of alternative methods that are known as erasure correction codes. K-to-N threshold mappings are generally more efficient than block erasure correction coding schemes. The message is then split into N parts, such that any K parts of the N parts are sufficient to reconstitute the original message. At least as soon as K parts of the message arrive at a destination host, the host may reconstruct the message. The number of addresses assigned to a host may be equal to N, so no two segments need be addressed to the same address of a host.

An attack against less than or equal to (N−K) of the participating hosts will not prevent delivery of traffic across the Vnet, for example, if the number of relay paths is greater than or equal to N. Robust transmission and masked traffic patterns may be achieved by sending each of the N message segments via a different relay path.

Embodiments that employ redundant pathways and redundant coding provide numerous benefits, some of which are now described. A host may deduce a condition of the Vnet through observation of received and non-received message segments. Denial-of-service attacks may be detected. The attack may also be monitored by continuing to send some message segments via a host that is under attack. Relay pathways may be restructured to maintain a uniform flow of messages across the Vnet. In alternative embodiments, non-uniform message flow can be achieved to camouflage message traffic.

A K-out-of-N mechanism, as described above, also may accommodate non-malicious network failures. Thus, for example, UDP may be employed as a network protocol for packet delivery between participating hosts, without sacrificing end-to-end reliability of communications. A channel coding technique may first encode the message to inject the desired level of redundancy into the message, then split the encoded message into multiple segments, and then forward each segment along a different path. At the receiving end, information recovery capabilities of the encoding method, for example, erasure-correcting techniques, may permit reassembly of the original message without requiring the successful delivery of all message segments through their individual paths.

Additional security is made possible by scrambling, even simple scrambling, of the positions of the encoded message bits, e.g., before splitting. This may prevent message reconstruction by an eavesdropper, even when the eavesdropper intercepts a sufficiently large number of message segments. Generally, scrambling and de-scrambling of bit positions requires many fewer operations to execute and complete than traditional encryption and decryption methods.

Figure 5:
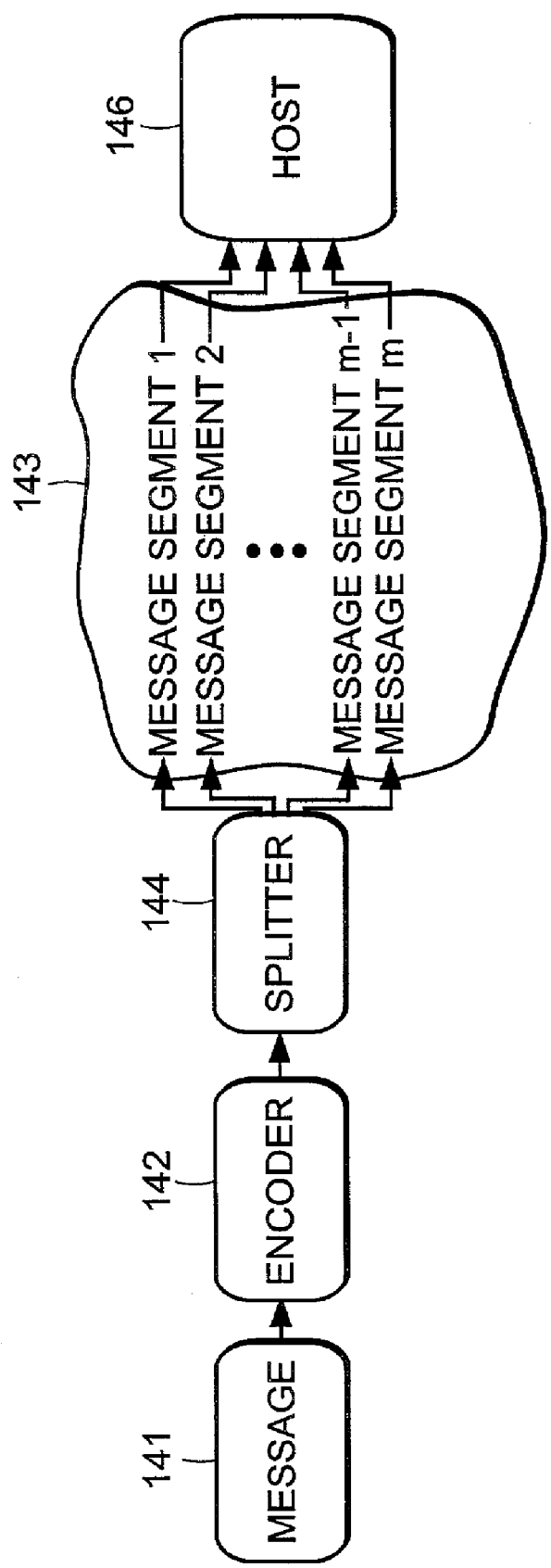
FIG. 5 illustrates an embodiment that includes integration of data encryption into a splitter and an assembler.

Referring to FIG. 5, an embodiment of a communication of a message from a source to a destination is illustrated. A message 141, e.g., a block of message bits, is fed to an encoder 142, e.g. a scrambling encoder. The encoder 142 may inject redundancy into the message bit stream, which increases the number of bits in the message. The encoded message is fed to a message splitter 144, which breaks the message into N message segments.

The N message segments are forwarded to the destination along multiple pathways 143 in a Vnet. A receiving host 146 is able to reconstruct the original message 141 as soon as any K segments of the encoded message 143 have been received. The threshold number of segments (K) needed to reconstruct the message is determined by the selected coding scheme. The parameters characterizing the particular encoding are provided in each message segment. The message encoder, message splitter and the message reconstructor may be implemented in hardware and/or as a software module.

In one embodiment, a message, or message block, that includes k bits is processed through an encoder, e.g., a scrambling encoder, that converts the message into an encoded message block of n bits, where n>k. A splitter decomposes the output of the encoder into N message segments, each segment including no more than [n/N] bits. N, n and k are positive integers.

Figure 6:
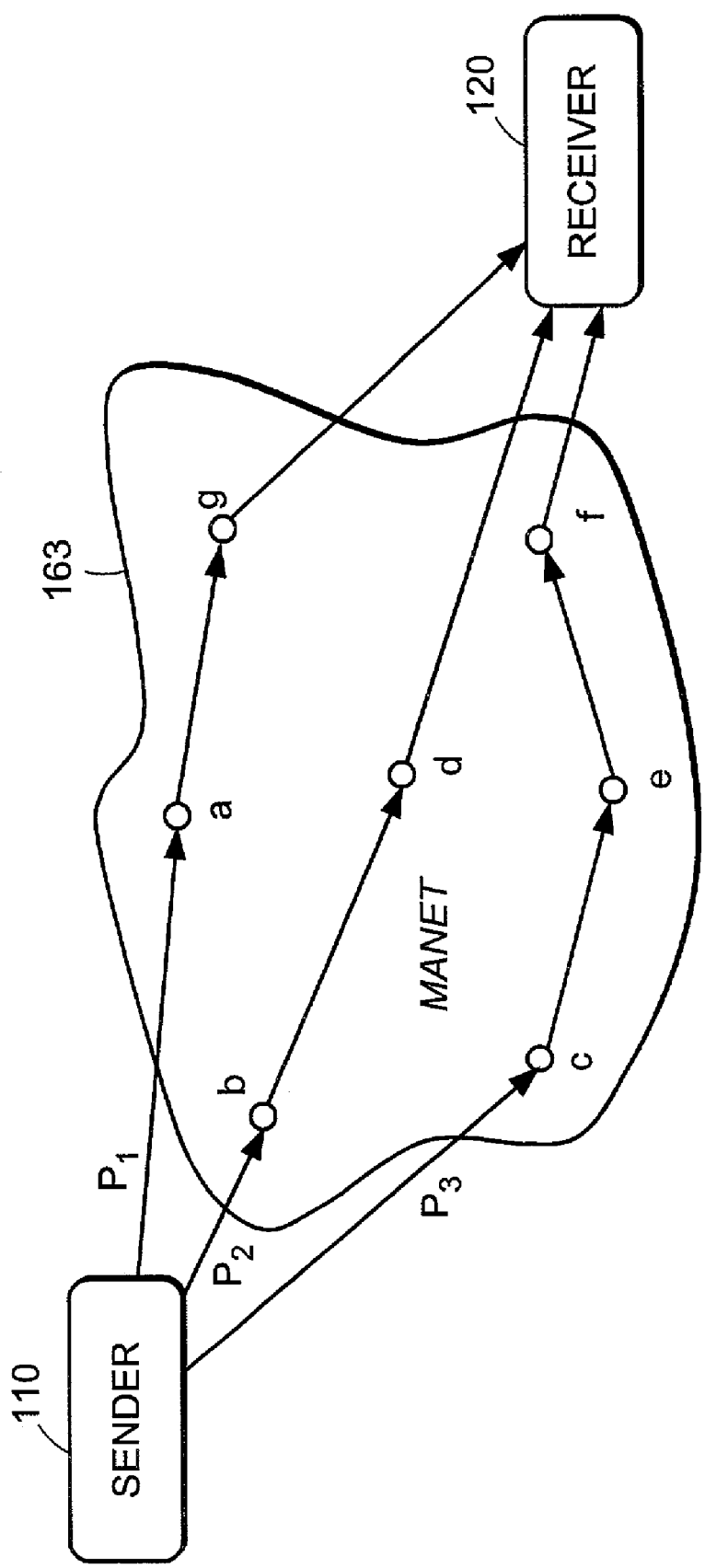
FIG. 6 illustrates an embodiment of spatial diversification of message transmission, which transmits split message segments along three paths through a network.

FIG. 6 is a diagram that illustrates spatial diversification of message traffic. Each of N message segments is forwarded to a recipient 120, preferably along a different route. This gives spatial diversification to the routes used for transmission. Nodes a–g are a subset of Vnet 163 nodes. A sender 110 forwards segments to the receiver 120 along path $P_1$ (including nodes a and g), path $P_2$ (including nodes b and d), and path $P_3$ (nodes c, e, and f). The different physical locations of the nodes forces the message segments to travel through different areas of the network. Link conditions and congestion in different areas may vary considerably.

The message segments are collected as they are received at the receiver 120. When a sufficiently large number of the message segments have been received, they are forwarded to the decoder, which recovers the entire original message. Improved delivery assurance is achieved because not all message segments must be successfully received to permit the recipient to recover the original message.

Some embodiments further improve security through use of data encryption by means of bit position scrambling. The selection of a scrambling encoder can be controlled with an encryption key. In some alternative embodiments, the actual bit scrambling can be accomplished in either an encoder or a splitter.

Some embodiments utilize permutation in an erasure-correcting encoding scheme. Alternatively, permutation may be employed in a message splitting scheme. For example, even a simple use of an encryption key to alter bit positions in the encoded message, could require an eavesdropper to search through n! possibilities.

Some embodiments include a scrambling encoder that implements an encoding scheme that provides one or both of the following features:

the encoding scheme provides strong erasure correction capability, preferably having the value of (k+e) as close to n as possible, where e is the number of erasures that the scheme can correct, k is the original message length, and n is the encoded message length; and no bits in the original message are ascertainable from any message subset below a threshold number; for linear block codes, this generally requires 1) use of no systematic codes, and 2) approximately half of the elements of a generating matrix have a value of 1.

In order for the assembler at the receiving host to correctly reassemble the message fragments, the content of each segment should be identified. In one embodiment, the information required for reassembly is reduced by inclusion of a numbering scheme for the message segments. In a preferred embodiment, a segment carries identification that is a number assigned by the message splitter. This number may be a field in a protocol header that is attached to each message segment.

In some implementations, a Vnet includes hosts that function as servers and hosts that function as clients. When a particular client is lost due to attack or mishap, a user can generally switch to another client. Loss of a server, however, may have a greater impact on Vnet performance. A denial-of-service attack that consumes most or all of a host's resource creates difficulty, for example, by preventing the server from responding to legitimate service requests from other hosts in the Vnet.

One approach that improves resistance to denial-of-service attacks provides the functionality of a server on multiple hosts. A second approach hardens the server against attacks.

The former approach may implement redundant distribution of services by placing the services outside of the Vnet. Application-level protocols may be separate and distinct from private protocols, as employed in a private header.

Figure 7:
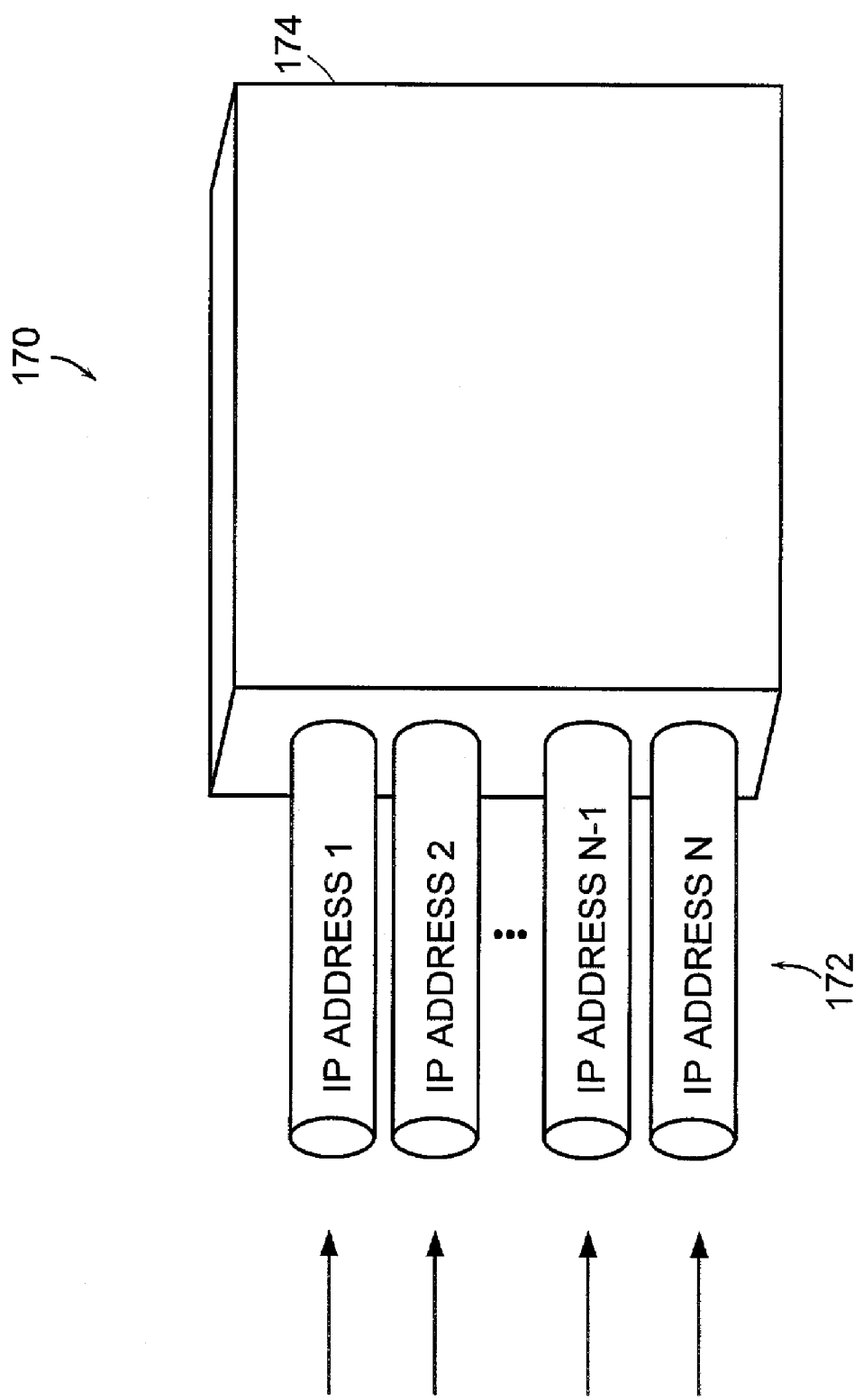
FIG. 7 illustrates an embodiment of a host that is identified by N IP addresses.

Referring to FIG. 7, some embodiments implement the latter approach of hardening a host in the Vnet. FIG. 7 is a block diagram of an embodiment of a host 170, which includes a portion 174 that has hardware and software components. The host also includes, i.e., is identified by, N addresses 172. At any one time, all N addresses may be active. That is, the host 170 may receive messages sent to any or all of the N addresses. Further, the host 170 may receive message segments that arrive simultaneously, addressed to more than one of the N addresses. Thus, all addresses 172 may simultaneously identify the host 170.

In another embodiment, a site may have a single host, e.g., a server, with a single high-bandwidth pipe to the Internet. The affects of a denial-of-service attack may be mitigated by providing a pool of IP addresses for use by the server, assuming that the pipe has sufficient bandwidth to withstand a flooding attack.

Figure 8:
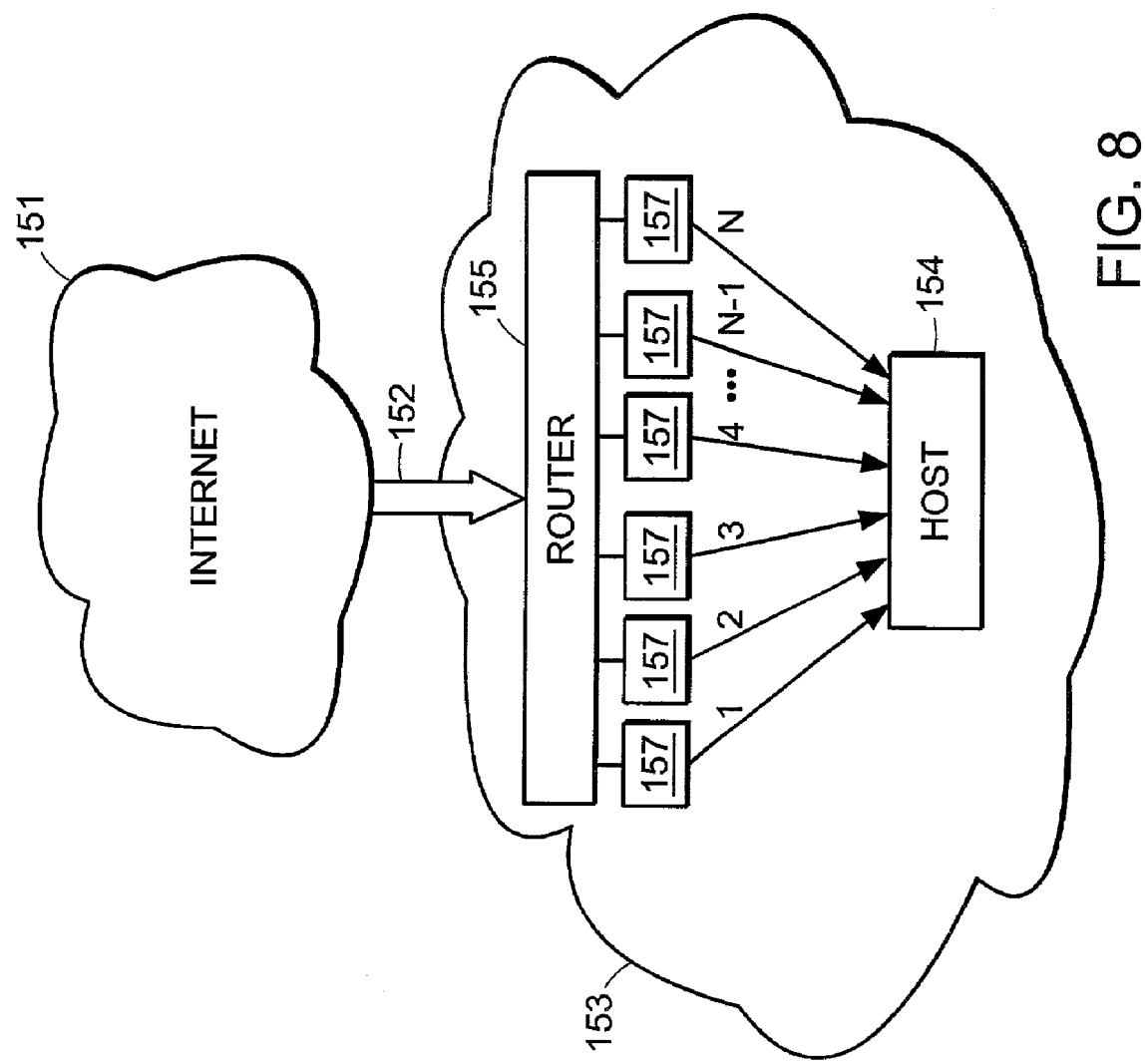
FIG. 8 illustrates an embodiment of a virtual network that makes use of the Internet for communication with a host that is identified by N addresses.

FIG. 8 is a block diagram that illustrates an embodiment in which a portion of a Vnet 153 includes a receiving server 154 and a router 155. The router 155 provides access to the Internet 151 via a pipe 155. The server 154 is identified by multiple, simultaneously active IP addresses. That is, the server 154 listens for the arrival of message segments 157 addressed with any of the N addresses.

For example, the server 154 may have N active IP addresses, where N is the same as the N defined previously for block erasure correction encoding. A host sending a message to the server may send N message segments 157 that are separately addressed to N addresses of the server. The server 154 may reconstruct the message if it receives message segments 157 on a subset of K of the N addresses. If an attack, for example, floods some of the addresses, the server may ignore messages directed to those addresses to permit continued reception of real messages.

This embodiment may force an attacker to diversify an attack so that the attack encompasses all IP addresses that lie behind a site router 155 because the attacker cannot identify a sufficient number of the addresses of the server 154. This will generally diminish the effectiveness of an attack. Messages sent by the server 154 may be broken into N pieces, each piece associated with a different one of the N addresses of the server 154. This complicates the task of an attacker that wishes to interfere with transmissions originating from the server 154.

Alternatively, a host has fewer active addresses than the number of message segments transmitted to the host. This circumstance is acceptable, as long as the number of addresses is sufficient to receive enough message segments to permit reconstruction of the message.

In some embodiments, a host is further protected by repeatedly reassigning a portion of the hosts IP addresses. For example, the host may have N active IP addresses at any one time, assigned from a pool of M addresses, where M>N. With implementation of the above described encoding scheme, reassignment of fewer than (N−K) addresses at any one time permits continuous reception of messages through use of the remaining addresses.

In some cases, other hosts in the Vnet are notified of the reassigned addresses. The reassigned addresses are not available for use until notification is completed. Hence, the remaining, unreassigned addresses may provide continuous functioning of the host. Addresses may be reassigned continuously. Alternatively, addresses may be reassigned periodically. As another alternative, addresses may be reassigned at random occasions, or as needed, for example, in response to an attack on the host.

Various types of attacks may be impeded. For example, a flooding attack of an address may fail to impair use of the remaining addresses. If the addresses are occasionally updated, the host presents both a large and moving target for an attacker. For example, an attacker who attempts to attack the server 154 via the Internet, may only be able to learn that an attacked address is no longer being used by the Vnet. The attacker generally will not be able to identify the other addresses of the host, in an attempt to extend the attack and shut down the server 154.

Figure 9:
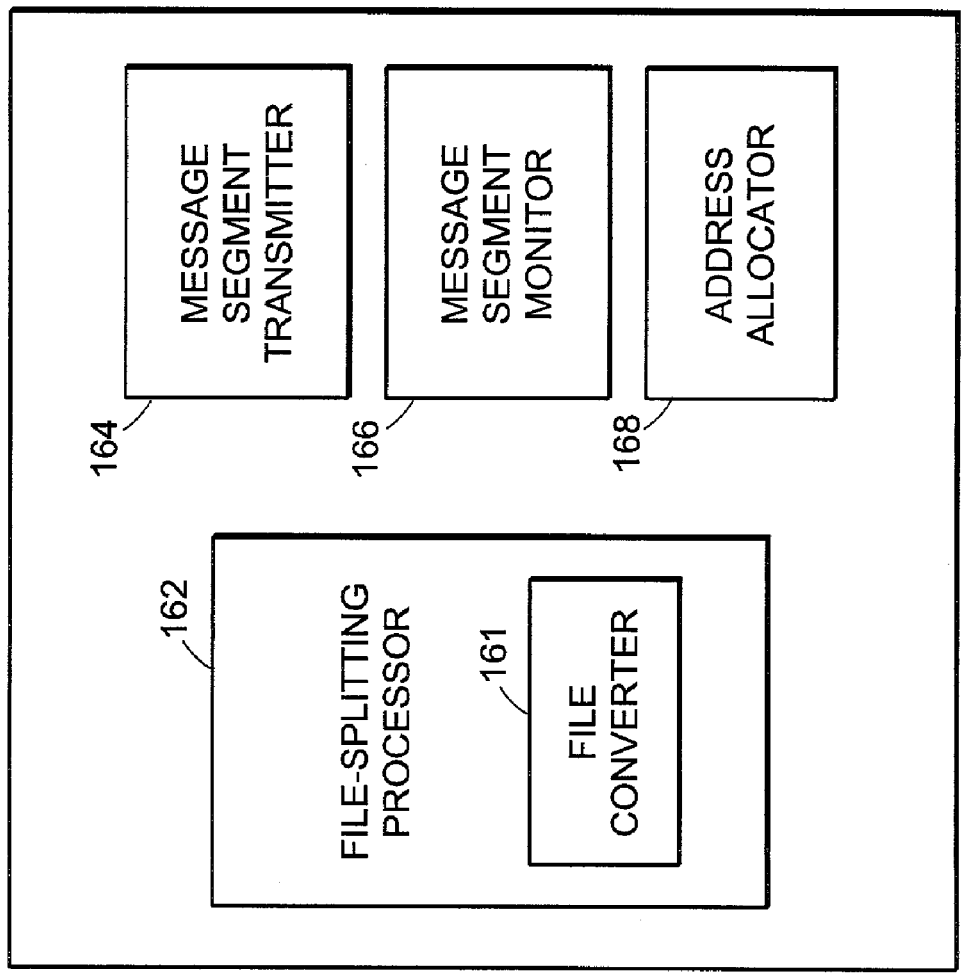
FIG. 9 is a block diagram that illustrates an embodiment of an apparatus for communicating via a network.
Figure 10:
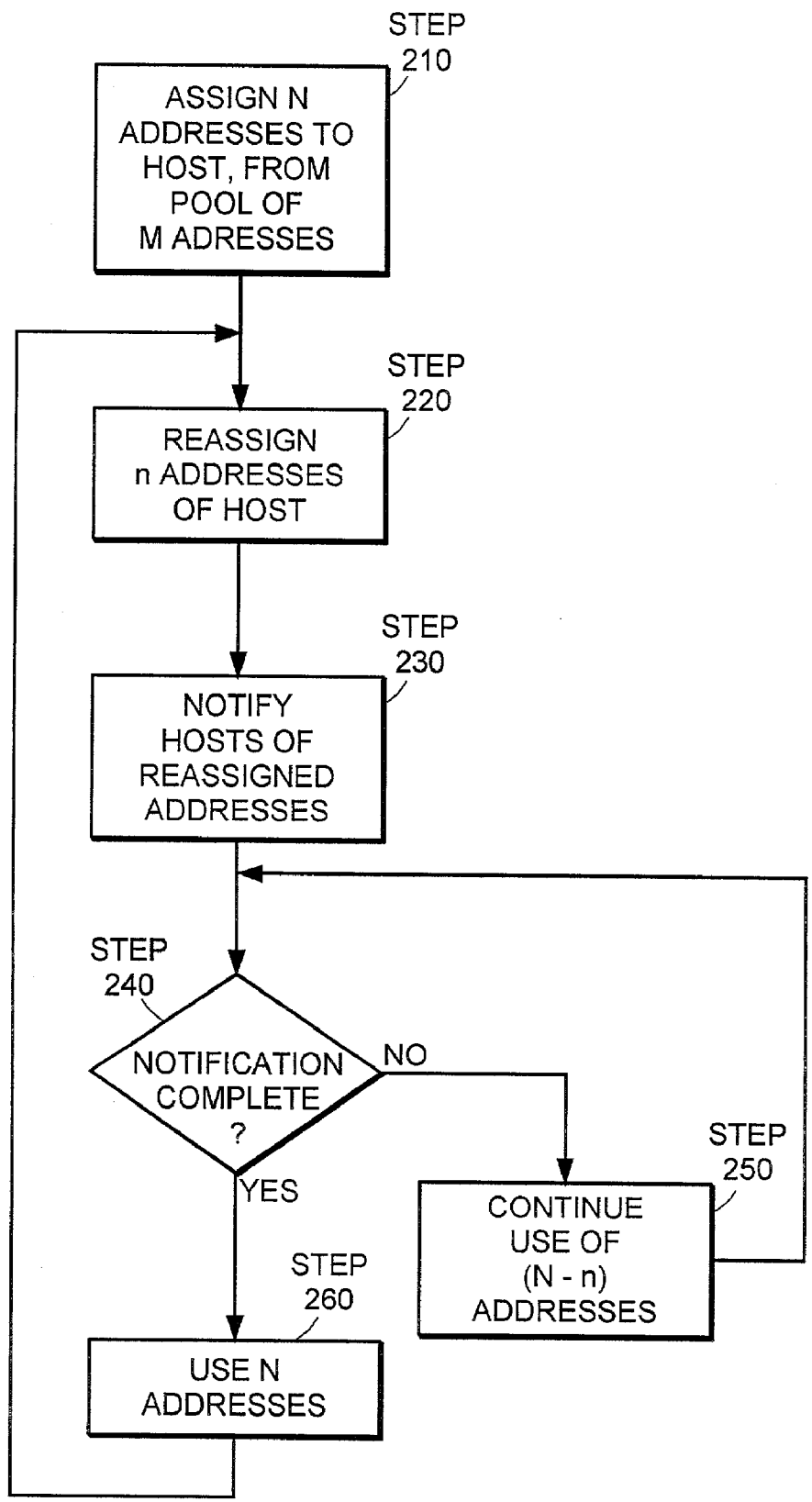
FIG. 10 is a flowchart that illustrates an embodiment of a method for reassigning the addresses of a host.

Referring to FIG. 9 and FIG. 10, embodiments of an apparatus and a method for transmitting a file through a network include features for reassignment of a portion of a set of addresses that identify a host. FIG. 9 is a block diagram of an apparatus for transmitting a file through a network 160. The apparatus includes a file-splitting processor 162, which may include a file converter 161. The apparatus 160 also includes a message segment transmitter 164, a message segment monitor 166 and an address allocator 168.

The file-splitting processor 162 splits the file into multiple message segments and addresses the plurality of message segments to multiple addresses of a receiving host. The message segment transmitter 164 transmits the message segments to the receiving host.

The file-splitting processor 162 may include a file converter 161 that converts the file into N message segments that enable reassembly of the file from a subset of any K of the message segments, where N and K are positive integers, and N>K>1. The file-splitting processor 162 may also assign multiple source addresses to the message segments to impede unauthorized attempts to observe the true source of a transmitted file. The processor 162 can be, for example, a computer microprocessor integrated circuit.

The address allocator 168 may be included for assigning and reassigning the N active addresses of the receiving host. Dynamic reassignment of addresses may protect a receiving host, and a network, from denial-of-service attacks. By updating only a portion of a receiving host's addresses at any one time, the remaining addresses may permit continuing operation of the receiving host. During continuing operation, other hosts in the network may be notified of the identity of the updated addresses.

The message segment monitor 166 may provide detection of non-receipt of message segments transmitted to the apparatus. In response to the possible tampering, detected via non-receipt of one or more message segments, the host can cease use of addresses used in the attack.

The various components of the apparatus 160 may include, for example, integrated circuits, such as microprocessors. A single integrated circuit or microprocessor may include, for example, the file-splitting processor 162, file converter 161, message segment monitor 166 and address allocator 168. One or more microprocessors may implement software that enables the functioning of the file-splitting processor 162, file converter 161, message segment monitor 166 and address allocator 168. Further, any of these or other components may be implemented in software, firmware or hardware (e.g. as an application-specific integrated circuit).

The software may be designed to run on general-purpose equipment or specialized processors having dedicated functionality.

FIG. 10 is a flowchart that illustrates one embodiment of a method for reassigning addresses of a host, to achieve secure transmission of a file through a network. N addresses are assigned to the host, selected from a pool of M addresses (step 210). During operation of the host, a subset of n, where n<(N−K), of the N addresses are reassigned (step 220). Other hosts in the network are notified of the changed addresses (step 230). While waiting for notification to be completed (step 240), the unchanged (N−n) addresses provide continuous operation of the host (step 250). After notification is complete (step 240), the newly assigned addresses may be used by the host (step 260). Addresses may again be reassigned by repetition of step 220 through step 260.

Alternatively, a host can commence listening on newly assigned addresses before all other hosts have been notified of the newly assigned addresses.

Figure 11:
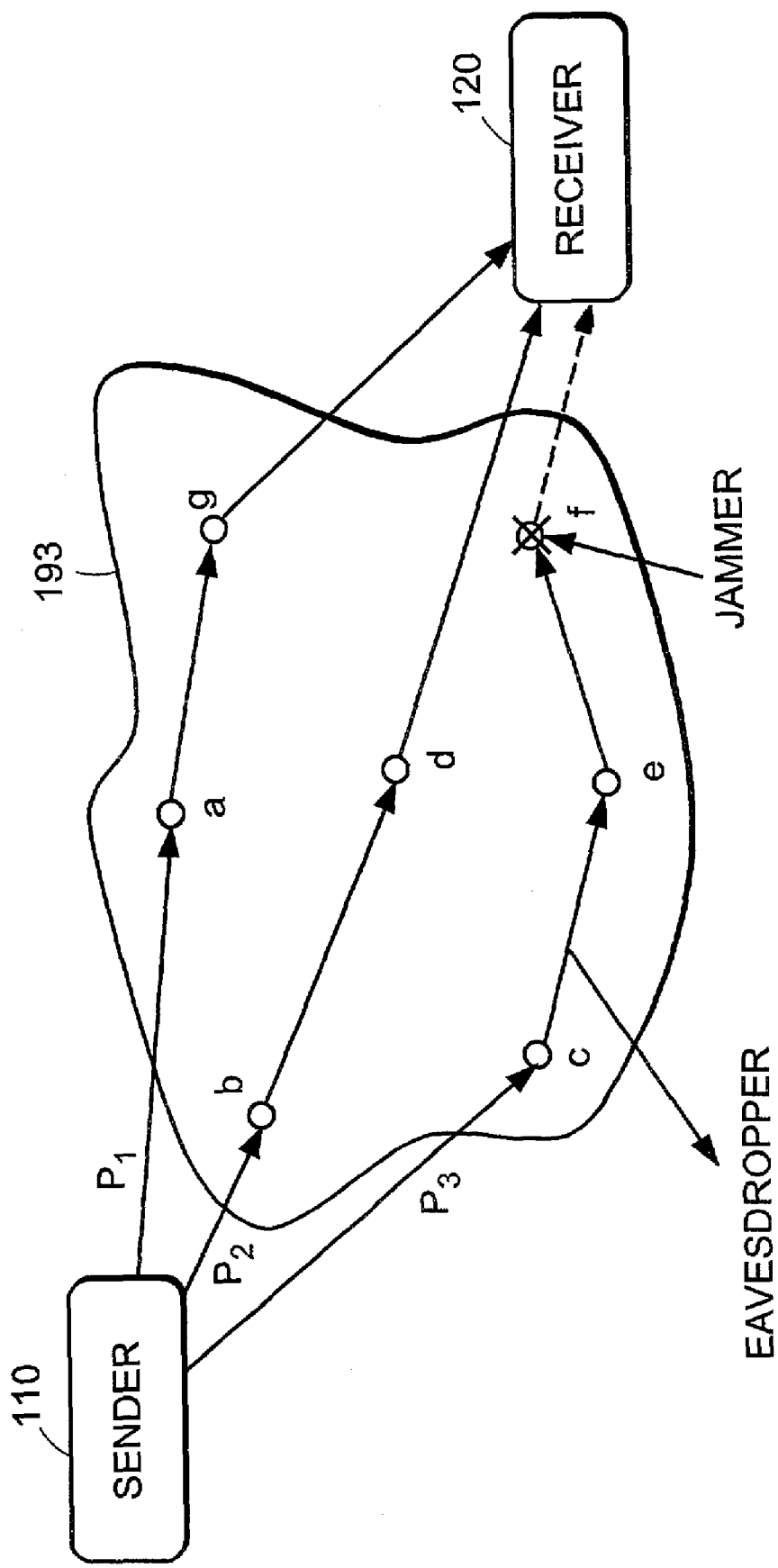
FIG. 11 illustrates an embodiment of a virtual network that only includes hosts that communicate with each other via the Internet.

Referring to FIG. 11, one embodiment of a Vnet only includes hosts that communicate with each other via the Internet. For example, the hosts are located at widely distributed geographic locations, and each host only has Internet access to provide communication with the other hosts in the Vnet.

A sender 110 and a receiver 120 agree to use a combination of an encoding scheme and a splitting mechanism that splits each message into three segments for transmission via the Internet or other open network. A portion of a Vnet 193 includes several nodes a–g.

The encoding scheme requires at least two message segments to reach the receiver for recovery of a split message. An eavesdropper is illustrated as intercepting message segments between nodes c and e; a jammer is illustrated as blocking transmission of message segments at node f. Three paths $P_1$, $P_2$, $P_3$ through the Vnet are a subset of all possible paths. Message security and integrity are maintained in spite of the efforts of the eavesdropper and the jammer.

The eavesdropper acquires only a message segment transmitted along path $P_3$. Because the threshold number of message segments is 2, the single segment does not provide any useful information to the eavesdropper. All three segments will reach the receiver 120. The first two to arrive are used to reassemble the original message.

The jammer attacking node f prevents the message segment traveling on path $P_3$ from reaching the receiver 120. The other two message segments arrive, and the message is recovered. The jammer cannot prevent the receiver 120 from reconstructing the message.

In an alternative embodiment, at least one of multiple hosts may be reassigned to a different domain, to change network traffic patterns. Such reassignment, however, may be undesirable because they can expose, for example, IP addresses in a pool of available addresses.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. An apparatus for transmitting a file through a network, the apparatus comprising:
    a file-splitting processor for splitting a file into a plurality of message segments and assigning one of a plurality of final different destination addresses to each segment, each of the plurality of final different destination addresses being assigned to a single receiving host; and
    a message segment transmitter for transmitting the plurality of message segments to the receiving host using the plurality of final different destination addresses.

2. The apparatus of claim 1 wherein the file-splitting processor further comprises a file converter for converting the file into N message segments such that the file is reassemblable from a subset of any K of the message segments at the receiving host, N and K being positive integers and N>K>1.

3. The apparatus of claim 1 wherein the file-splitting processor is configured for assigning one of a plurality of initial source addresses to each of the plurality of message segments, thereby impeding attempts to ascertain the source of the file.

4. The apparatus of claim 1, further comprising a message segment monitor for detecting non-receipt of a subset of the plurality of message segments.

5. The apparatus of claim 1, further comprising an address allocator for assigning a subset of the plurality of destination addresses to the receiving host.

6. An apparatus for transmitting a file through a network, the apparatus comprising:
    a file-splitting processor for splitting the file into a plurality of message segments and assigning one of a plurality of different initial source addresses to each message segment of the plurality of message segments, each initial source address being assigned to a single source host, thereby disguising the origin of the file; and
    a message segment transmitter for transmitting the plurality of message segments to a receiving host.

7. The apparatus of claim 6 wherein the file-splitting processor is configured for assigning one of the plurality of different final destination addresses assigned to the receiving host to each message segment of the plurality of message segments.

8. A method for securely transmitting a file through a network, the method comprising:
    (a) at a source host, splitting the file into a plurality of message segments;
    (b) addressing, at the source host, each message segment of the plurality of message segments using one of a plurality of different final destination addresses, each of the different final destination addresses being assigned to a single receiving host; and
    (c) transmitting the plurality of message segments to the receiving host with the plurality of different final destination addresses.

9. The method of claim 8 wherein the plurality of message segments are addressed in one-to-one correspondence to at least a subset of the plurality of different destination addresses.

10. The method claim 8 wherein splitting the file into a plurality of message segments comprises converting the file into N message segments such that the file is reassemblable from a subset of any K of the message segments, N and K being positive integers and N>K>1.

11. The method of claim 10, further comprising assigning N different final destination addresses to the receiving host, wherein the N message segments are addressed using one of the N final different destination addresses assigned to the receiving host.

12. The method of claim 11, further comprising causing the receiving host to cease receiving messages on at least one of the N different final destination addresses in response to an attack on the at least one of the final destination addresses.

13. The method of claim 12 wherein the receiving host ceases to receive messages via no more than (N–K) different final destination addresses, thereby facilitating reassembly of the file by the host.

14. The method of claim 11, further comprising:
(e) reassembling the N message segments into a reassembled file at the receiving host;
(f) splitting the reassembled file into a second set of N message segments at the receiving host; and
(g) transmitting the second set of N message segments from the receiving host using the N different final destination addresses.

15. The method of claim 10, further comprising:
(d) periodically reassigning at least a subset of the plurality of different final destination addresses assigned to the receiving host while leaving at least K of the different final destination addresses unchanged thereby permitting continuous receipt of messages by the receiving host, and
(e) notifying at least a portion of the network of the reassigned different final destination addresses.

16. The method of claim 8, further comprising:
(d) retransmitting the plurality of message segments from the receiving host.

17. The method of claim 16, wherein retransmitting the plurality of message segments from the receiving host comprises retransmitting the plurality of message segments to at least two of a plurality of intermediate hosts, thereby relaying the plurality of message segments along more than one path through the network.

18. The method of claim 8, further comprising:
(d) selecting a virtual network comprising a plurality of hosts, the plurality of hosts including the receiving host;
(e) assigning each host of the plurality of hosts to a domain of a plurality of domains;
(f) designating sets of the host pairs, each host pair comprising two hosts assigned to the same domain or a neighboring domain; and
(g) constraining travel of each message segment of the plurality of message segments to the receiving host via relays between host pairs.

19. The method of claim 8, further comprising:
(d) assigning a source address selected from a plurality of initial source addresses to each message segment of the plurality of message segments, thereby impeding attempts to ascertain the source of the file.

20. The method of claim 8, further comprising:
(d) receiving, at the receiving host, at least a portion of the plurality of message segments;
(e) reassembling the file from the received message segments at the receiving host;
(f) splitting the reassembled file into a second plurality of message segments at the receiving host; and
(g) transmitting the second plurality of message segments from the receiving host.

21. The method of claim 8 wherein step (c) comprises transmitting the plurality of message segments to at least one of an intermediate host and a destination host.

22. The method of claim 8 wherein step (c) comprises transmitting from at least one of a source host and an intermediate host.

23. The method of claim 8, further comprising monitoring non-receipt by the receiving host of at least one of the plurality of message segments.

24. The method of claim 8, further comprising:
(d) allocating M different final destination addresses for assignment to the receiving host;
(e) assigning N final destination addresses of the M allocated final destination addresses, where N is less than or equal to M; and
(e) periodically reassigning to the receiving host at least a portion of the N final destination addresses.

25. The method of claim 8, further comprising:
(d) adding status information associated with a sending host to the message segment; and
(e) upon receipt by the receiving host, interpreting the status information to detect tampering with message segment transmission.

26. The method of claim 8, further comprising:
(d) encoding the file to produce an encoded bit file having encoded bits, and
(e) scrambling the encoded bits, such that the encoded bit file is split into a plurality of message segments.

27. A method of securely transmitting a file through a network, the method comprising:
(a) splitting the file into a plurality of message segments at a source host;
(b) at the source host, assigning one initial source address of a plurality of different initial source addresses to each message segment of the plurality of message segments, each of the different initial source addresses being assigned to the source host, thereby disguising the origin of the file; and
(c) transmitting the plurality of message segments.

28. The method of claim 27, further comprising:
(d) assigning one final destination address of a plurality of final destination addresses assigned to a receiving host to each message segment of the plurality of message segments.

29. A method for securely transmitting a file through a network, the method comprising:
(a) splitting the file into a plurality of message segments, each message segment comprising:
(i) one of a plurality of different final destination specifiers, each of the final destination specifiers being attributed to a single final destination host;
(ii) encrypted protocol information; and
(iii) encrypted message data;
(b) receiving a message segment at a receiving host;
(c) decrypting the message data to determine the final destination host;
(d) encrypting the message data in accordance with an encryption protocol accessible to the final destination host;
(e) transmitting the encrypted message segment to the final destination host; and
(f) repeating steps (a)–(e) for other message segments, thereby facilitating recovery of the message by the final destination host.

30. The method of claim 29, wherein the message segment has a length, and further comprising altering the length.

31. The method of claim 29, wherein the receiving host and the final destination host negotiate to determine the encryption protocol.

32. The method of claim 29, further comprising causing the receiving host to adding status information concerning the receiving host to the message segment, and, at the receiving host, interpreting the status information to detect tampering with message segment transmission.

* * * * *